United States Patent
Wilker et al.

(10) Patent No.: US 7,804,032 B2
(45) Date of Patent: Sep. 28, 2010

(54) SECTION FOR A WINDOW OR FACADE AND ELECTRIC CABLE FOR A SECTION FOR A WINDOW, DOOR OR FACADE

(75) Inventors: Burkhard Wilker, Bielefeld (DE);
Carsten Hanke, Bielefeld (DE);
Markus Oestermann, Sendenhorst (DE)

(73) Assignee: Schuco International KG, Bielefeld (DE)

( * ) Notice: Subject to any disclaimer, the term of this patent is extended or adjusted under 35 U.S.C. 154(b) by 265 days.

(21) Appl. No.: 11/814,071

(22) PCT Filed: Jan. 13, 2006

(86) PCT No.: PCT/EP2006/050207

§ 371 (c)(1),
(2), (4) Date: Jul. 18, 2007

(87) PCT Pub. No.: WO2006/075024

PCT Pub. Date: Jul. 20, 2006

(65) Prior Publication Data

US 2008/0099228 A1      May 1, 2008

(30) Foreign Application Priority Data

Jan. 14, 2005   (DE)   .................... 20 2005 000 582 U
Jan. 14, 2005   (DE)   .................... 20 2005 000 607 U
Jan. 14, 2005   (DE)   .................... 20 2005 000 608 U

(51) Int. Cl.
*H02G 3/04*   (2006.01)

(52) U.S. Cl. ........................................ 174/480; 174/481

(58) Field of Classification Search ............. 174/110 R, 174/113 R, 117 R, 117 F, 117 FF, 480, 481
See application file for complete search history.

(56) References Cited

U.S. PATENT DOCUMENTS

| | | | | |
|---|---|---|---|---|
| 2,595,452 | A * | 5/1952 | Geist et al. | 174/68.3 |
| 3,984,621 | A * | 10/1976 | Propst | 174/482 |
| 4,235,495 | A | 11/1980 | Propst et al. | |
| 4,716,698 | A | 1/1988 | Wilson et al. | |
| 4,777,325 | A * | 10/1988 | Siwinski | 174/34 |
| 4,881,907 | A * | 11/1989 | Bergman et al. | 439/111 |
| 4,941,258 | A * | 7/1990 | Wright | 29/858 |
| 4,990,098 | A * | 2/1991 | Neidecker et al. | 439/207 |
| 5,024,614 | A * | 6/1991 | Dola et al. | 439/114 |
| 5,180,890 | A * | 1/1993 | Pendergrass et al. | 174/117 F |
| 6,036,259 | A * | 3/2000 | Hertel et al. | 296/216.01 |
| 6,215,068 | B1 * | 4/2001 | Meier | 174/68.1 |
| 6,386,620 | B1 * | 5/2002 | Fukumoto et al. | 296/155 |
| 6,482,018 | B1 * | 11/2002 | Stekelenburg | 439/111 |
| 6,835,075 | B2 * | 12/2004 | Truggelmann | 439/110 |

FOREIGN PATENT DOCUMENTS

| | | |
|---|---|---|
| EP | 0212962 | 3/1987 |
| EP | 0475417 B2 | 3/1992 |
| JP | 11-346424 A | 3/2000 |

* cited by examiner

*Primary Examiner*—William H Mayo, III
(74) *Attorney, Agent, or Firm*—Barnes & Thornburg LLP

(57) ABSTRACT

A frame section for a window or a door or a façade. The frame section includes an external shell and an internal shell. Each shell has hollow chambers. At least one of the shells includes a first groove and a second groove. The first groove is configured to accommodate hardware fittings. The second groove is configured to accommodate a cable.

32 Claims, 6 Drawing Sheets

SECTION FOR A WINDOW OR FACADE AND ELECTRIC CABLE FOR A SECTION FOR A WINDOW, DOOR OR FACADE

CROSS-REFERENCE TO RELATED APPLICATIONS

This is a National Phase Application based upon and claiming priority to PCT/EP2006/050207, filed on Jan. 13, 2006, which relies for priority on German Patent Application No. 20 2005 000 582.7, filed on Jan. 14, 2005, German Patent Application No. 20 2005 000 608.4, filed on Jan. 14, 2005, and German Patent Application No. 20 2005 000 607.6, filed on Jan. 14, 2005, the contents of all of which are incorporated herein by reference.

FIELD OF THE INVENTION

The invention relates to an electric cable for a section for a window, door or facade and a window or facade section, in particular one with such a cable.

DESCRIPTION OF THE RELATED ART

In the case of windows or doors with electric functional elements such as electric-motors or electromagnetic drives, fittings, sensors, or with other consumers of electrical power, it is necessary to install a cable to the electric functional elements for power supply and/or control purposes.

According to the state of the art, in the case of sections, cables are run through hollow chambers or are installed loosely along the outside perimeter of the door or window sections. EP 0 475 417 B2 shows a solution with a cable guided through hollow chambers in building facades. The reference describes a section design with a cable groove located on the outside perimeter of an insulation section or of an external section in the area of the glass recess for a form-fitting accommodation of an electric cable. A particular disadvantage of this design is the difficult accessibility in the area of the glass rebate or recess as well as the location in a moist section of the facade, which involves the danger of creeping currents and corrosion.

In addition, the known arrangements are often optically unsatisfactory. For other reasons, the known arrangements also do not meet the requirements of a modern assembly process. For example, the hollow chambers in the corner area must be closed with corner connectors—which may make additional machining necessary, e.g. by milling for the installation of the cable through the corner area. Also, additional functional elements must be arranged in grooves that accommodate the cables. Thus, the cables are virtually lying in the open and unprotected and make production more expensive. Elaborate access ways and/or connections are required as well.

SUMMARY OF THE INVENTION

The invention provides a cable of the generic kind in such a manner that these problems associated with the prior art resolved, at least in part. Furthermore, a section and a window, a door or a facade element are provided into which the cable may be integrated, requiring only minor installation effort.

According to one embodiment of the invention, the cable is shaped like a ribbon with lateral noses (or shoulders) at its narrow sides that are designed to engage flexibly behind nose pieces of a cable groove on the frame section when the cable is mounted in the cable groove.

This way, the ribbon cable may be installed easily and without any complications and may be accommodated visually attractively in the frame section.

"Section" in the sense of this application refers, at least in part, to a multipart interlocked braced system section as well as an individual metal section for the creation of a blind frame or sash.

The invention provides for a frame section for a window, a door or a facade element with a ribbon cable of the aforementioned kind that features a cable groove extending in the longitudinal direction of the frame section for a form-fitting accommodation of the ribbon cable.

The cable groove provides a space-saving, optically attractive accommodation of the ribbon cable directly on the section, in particular at one of the sections of the sash. An accommodation on the blind frame is also conceivable. However, the arrangement on the sash is preferred if power consuming and functional elements are to be located there as well. This cable groove may be easily formed or shaped during the production of the section without requiring any production steps beyond the production steps that are required traditionally for the production of the section.

The cable groove simplifies the assembly considerably. This advantage becomes especially clear with the utilization of the ribbon cable as suggested by the invention, which is simply clipped into the cable groove.

It is particularly advantageous in this respect if the cable groove and the cable are adapted to each other in such a way so that the cable conductors may be accessed from the exterior by means of insulation-piercing and/or insulation-cutting contacts since, in this way, contacting occurs without the use of tools.

According to one embodiment of the invention, the cable groove is formed on the frame section within a surrounding larger groove, in particular within a groove adapted to accommodate fittings, and/or the cable groove and the cable are adapted to each other in such a way that contacting the conductors of the cable is possible from the exterior by means of insulation-piercing and/or insulation-cutting contacts.

The "groove within a groove" enables, in the simplest way, a space-saving, visually attractive accommodation of a multiconductor electric cable directly on the frame section, in particular on one of the sections of the sash. An accommodation on the blind frame is also conceivable, however, an accommodation on the sash is preferred if the power consuming and functional elements that are to be supplied are located there as well.

The cable groove may be easily formed or shaped during the production of the section without requiring any additional production steps beyond the production steps that are traditionally required for the production of the section.

The cable groove simplifies the installation considerably. This advantage becomes especially clear with the utilization of the suggested cables for a tool-free contacting of the conductors with the aid of piercing contacts. Ribbon cables are particularly well suited to this end, which are simply clipped into the cable groove. But cables with a shape deviating from a ribbon cable geometry are conceivable as well, e.g. those with a slightly oval cross section.

In addition to the individual sections, the invention also provides complete window, door or facade elements with such sections.

The invention relates to a facade section for a facade element and a facade element with such a facade section. This has the following background. In the case of facades with electric function elements, such as photovoltaic elements or power consumers such as illumination devices or sensors, it is desirable to run a cable to the electric function elements for energy supply and/or control purposes. According to the state of the art, the cables are guided to these electrical function elements through hollow chambers, for example. EP 0 475 417 B2 describes a cable routing through the hollow chambers. The specifications also show a facade design with a cable groove arranged on the external circumference of an insulator or of an exterior section in the area of the glass recess for a form-fitting accommodation of an electric cable. A particular disadvantage of this design is the poor accessibility and troublesome installation in the area of the glass rebate or recess. In addition, another disadvantage of this design lies in the placement of the electrical cable in a moist section of the facade, which involves the danger of creeping currents and corrosion. The invention solves at least these problems.

In accordance with this design feature, a facade section is created initially for a facade with an undercut cable groove located on the exterior circumference of the facade section for a form-fitting accommodation of an electric cable with at least two or more electric conductors. The facade section features at least an internal profile, preferably an insulation bridge and an external shell. The cable groove is attached to the internal profile of the facade. Preferably, the cable groove and the cable are adapted to each other in such a way that the conductors of the cable in the cable groove may be contacted from the exterior thereof by means of insulation-piercing and/or insulation-cutting contacts.

In the groove, the cable can be accommodated while being protected from any moisture, and the cable is easy to install in the groove. By this construction, the disadvantages of the state of the art are remedied in simple fashion. Particular preference, for the avoidance of any moisture problems, is given to the use of a box profile on the internal profile including the groove. A lateral wall of the box profile preferably is vertical to the plane of the window pane in this embodiment. In addition, the "groove in the groove" design enables in the simplest fashion a space-saving, visually attractive accommodation of a multi-conductor electric cable directly on the facade section, in particular on one of the facade sections of the section. A facade section, in the sense of the invention, is to be understood as a multipart composite section as well as an individual metal section for the creation of a facade element. The cable groove can be easily formed or shaped during the production of the facade section without requiring any production steps in addition to those production steps that are required traditionally for the production of the section.

The cable groove simplifies the assembly considerably. This advantage becomes especially clear with the utilization of the suggested cables permitting tool-free contact with the aid of piercing contacts. Ribbon cables are particularly well suited to this end since they are simply clipped into the cable groove. But cables with a shape deviating from a ribbon cable geometry are conceivable as well, e.g. those with a slightly oval cross section.

The frame section or the facade section can be made of metal, in particular of a light metal, wood or plastic.

In addition to the individual facade sections, the invention also provides complete facade elements with such sections.

Additional embodiments of the invention also may be appreciated from the disclosure that follows and the claims appended hereto.

BRIEF DESCRIPTION OF THE DRAWINGS

In the following, the invention is described in detail by means of one or more embodiments, with references being made to the drawings.

DETAILED DESCRIPTION OF EMBODIMENT(S) OF THE INVENTION

Figure 1:
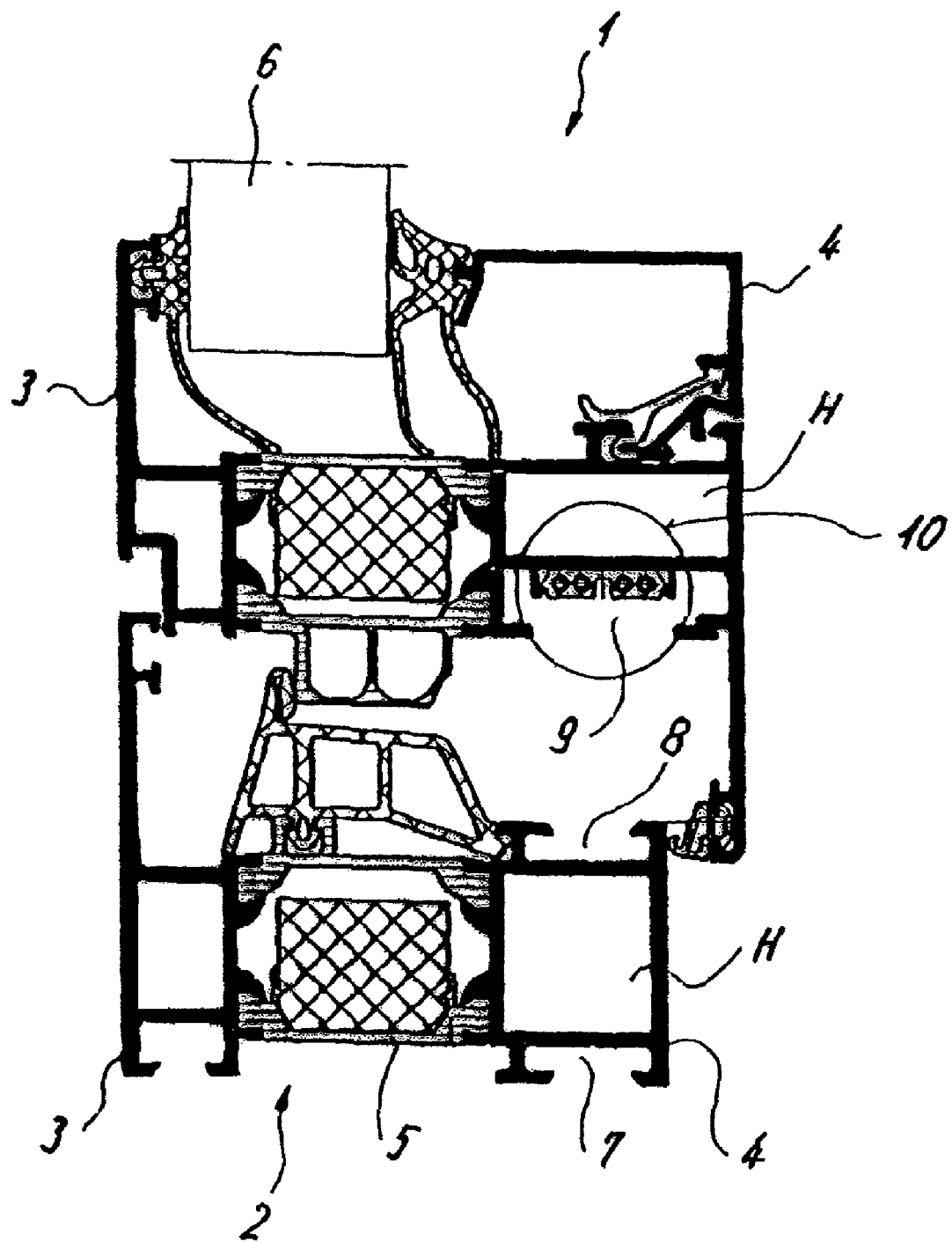
FIG. 1 shows a partial cross section of a window segment.

FIG. 1 shows a partial cross section of a window, consisting of a sash 1 that is attached movably to a blind frame 2. The blind frame 2 is connected to some brickwork or integrated in a facade.

The sections of the sash 1 or, respectively, of the blind frame 2, are in each case manufactured as composite sections and have an external shell 3 and an internal shell 4 as well as a heat insulation zone that consists of insulation bridges 5 that connects the internal shell 3 with the external shell 4.

The external shell 3 and the internal shell 4—that is, the individual sections of the composite section—are each made of metal sections and consist, for example, of a light-metal material or of steel. It is also conceivable to make them of wood or plastic. For example, in warmer climactic zones and/or in the internal refurbishing of buildings, it is also conceivable to dispense with a composite design with an insulation bridge 5. A glass insulation pane 6 is set into the sash.

The individual sections 3, 4 of the sash 1 and of the blind frame 2 each have hollow chambers H as well as various grooves on their external circumference, in particular grooves 8, 9, to accommodate corresponding function elements such as fittings or drives, for example, to lock the vane on the sash 1 or to open and/or close the vane.

The fitting grooves are specially designed at the sides of the blind frame 2 and the sash 1 that face each other. A blind frame groove 7 serves the form-fitting connection with adjoining construction elements (facade, additional windows, doors, etc.) or the connection to the wall. The hollow chambers H serve especially to accommodate the corner connectors and as heat insulation.

The section is preferably made of metal, in particular of a light metal. It may also be made of wood or plastic.

Figure 2:
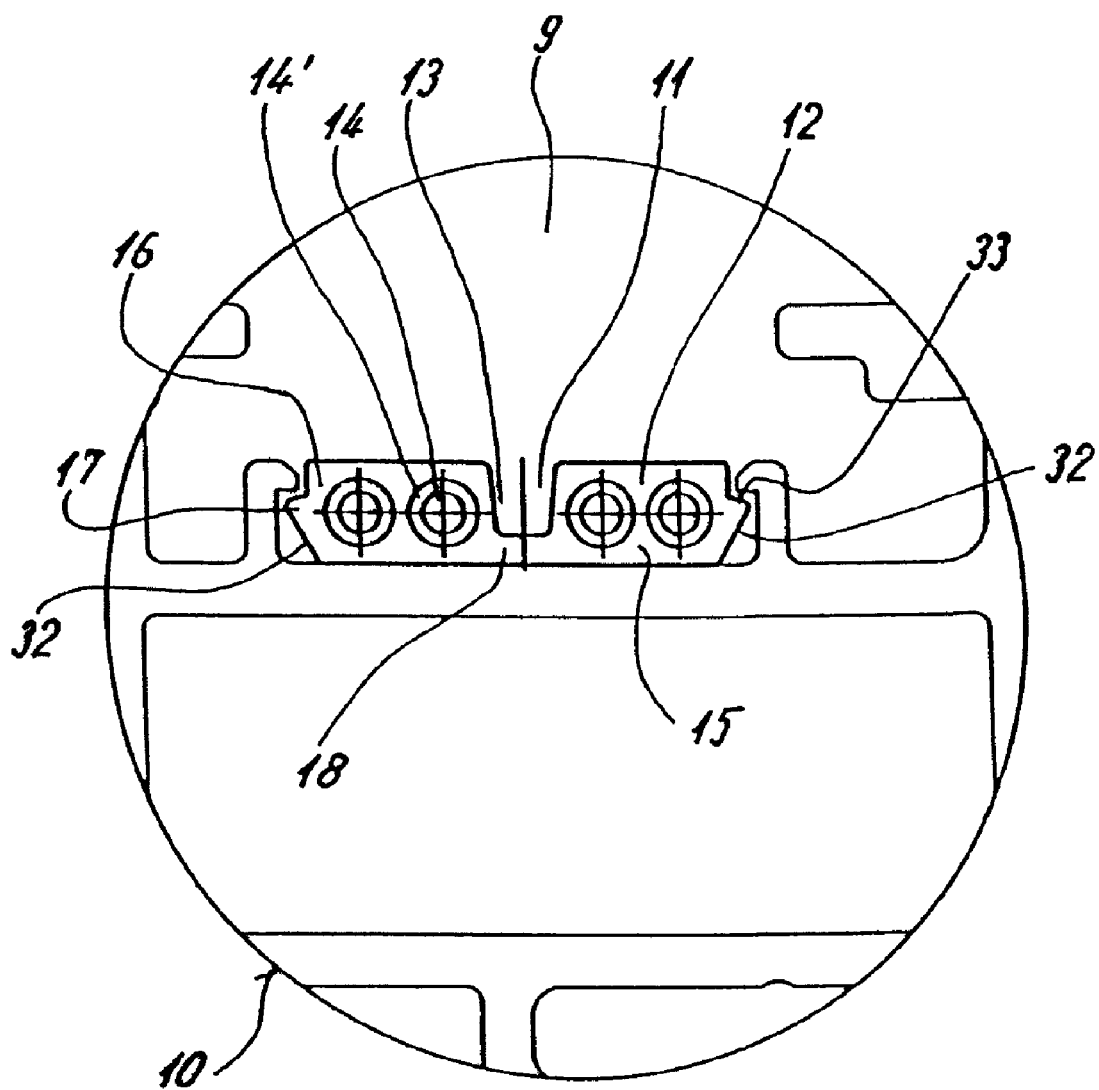
FIGS. 2 and 3 show enlarged sections of portions of the window segment illustrated in FIG. 1, each slightly enlarged with respect to each other, with and without an electrically conductive cable.

FIG. 2 shows the pane section 10 indicated in FIG. 1.

It is easy to recognize that at least one cable groove 11 is arranged on the external circumference of the sash section, preferably extending parallel to the section 1, for a form- and force-fitting accommodation of an electric cable 12. This cable groove 11 is arranged here at the base of the fitting groove 9 of the sash section 1 because the ribbon cable 12 is thereby arranged in a place-saving manner under fitting parts, and is invisible from the exterior. But an arrangement at any other location of the external circumference of the section is conceivable as well.

The ribbon cable 12 (see FIGS. 3 through 5) can be easily clipped into the cable groove 11 from outside. The cable groove 11 in groove 9 extending parallel to the section at its exterior side provides the advantage that the ribbon cable 12 lies protected and covered and does not disturb the view from the window, without making the installation of the fittings in their groove 9 more difficult and without the ribbon groove 11 hampering such installation.

It would also be conceivable to provide a corresponding cable groove 11 on the blind frame (not shown here) or in another groove of the window or in a separate groove directly on the external circumference. This construction is preferred for facades since otherwise only the glass recess (or rebate) is available here, which is however relatively disadvantageous due to the occurrence of moisture. But the compact arrangement of the cable groove 11 in the fitting groove 9 of the interior shell 4 of the sash section 1 is preferred, especially in a gap area opposite the blind frame.

Depending on the design, the sash section 1 can be used for the creation of a swivel window, a tilting window, a tilting/swivel window, a sliding window or, for example, glazing for a door or other structure(s) on a balcony. Alternatively, doors or facade elements can be made, with the latter also including light roof elements, in accordance with the present disclosure.

The cable groove 11 for the accommodation of an electrically conductive cable will always be advantageous when the task at hand is to provide energizeable, functional elements on the window, such as locking elements, sensors, illuminating devices such as illuminating diodes, or a drive for opening and closing the window.

To that end, the ribbon cable 12 is run, for example, from a transitory location on the blind frame to the sash 1 and then guided along the external circumference of the sash section 1 to the functional elements that are to be controlled or supplied with energy, such as a drive or an electric locking mechanism.

As illustrated in this embodiment, the ribbon cable 12 includes four conductors and/or strands 14 arranged parallel to each other in one layer, each of which has an insulation layer 14' and all of which are imbedded in the casing 15 and/or base plate 16 of the ribbon cable 12, and which may be contacted in the groove from the exterior, for example by means of piercing contacts.

The cable casing 15 and/or the base plate 16 is provided in this embodiment with a groove-like notch 13 between the two central conductors 14, which notch runs parallel to the conductors 14 in their longitudinal direction and which provides the advantage of aligning and/or centering the ribbon cable 12 in the groove 11 by placing on the groove 11 a corresponding plug contact that has a centering projection that meshes with the notch 13 (not seen here).

In the illustrated embodiment, the notch 13 has a conical cross section and penetrates the ribbon cable 12 almost completely (e.g. by approximately 60-70%), which means that the ribbon cable 12 may be folded, bent and/or compressed when plugged or inserted into the cable groove 11 until it is located in the cable groove 11 where it will expand again to fill the groove 11. The notch 13 also serves to center, by means of a corresponding centering device (a frame element, for example, not shown here), so that the strands 14 can be precisely contacted.

In one embodiment, the ribbon cable 12 is elastic. In particular, the casing 15, which forms a base plate 16, is made of a flexible material, e.g. of ethylene propylene diene monomer rubber (EPDM), in order to make it possible to bend or run the ribbon cable 12 easily around any corners on the sash 1. In this context, the cable groove 11 may also be formed on the upper and/or lower and/or opposite section of the sash 1, i.e. completely or partially circumferential (again not seen here).

As illustrated, the ribbon cable 12 features, in exemplary fashion, four strand-like conductors 14. However, embodiments with more or fewer conductors 14 are conceivable as well if, for example, only one power source is required to supply an electric drive, or if the supply of many drives is necessary. This particular embodiment of the ribbon cable 12 facilitates maintenance of a supply (or stock) of the ribbon cable 12.

Figure 3:
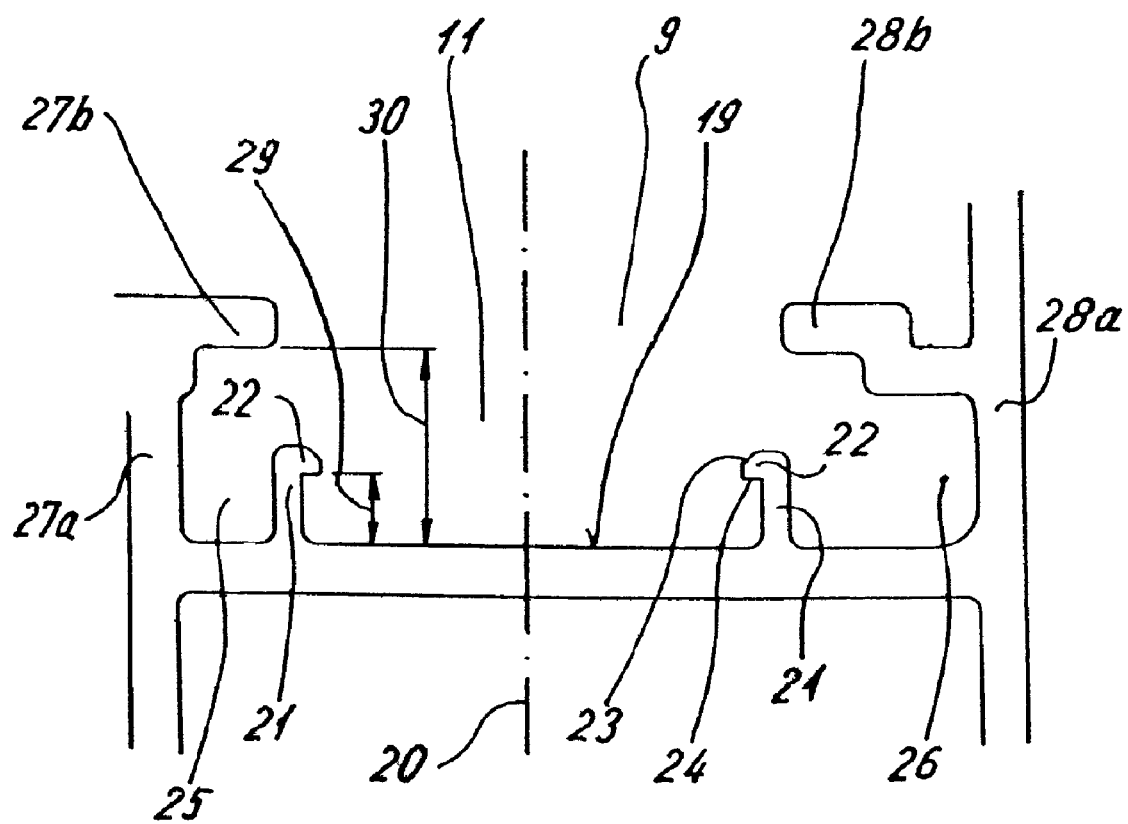

The ribbon cable 12 includes lateral projections (or shoulders) that engage elastically behind the bridges (or ridges) 22 associated with the cable groove 11, as illustrated in FIG. 3.

The shoulders or lateral projections 17, in turn, have slanted or inclined surfaces 32 at their sides pointing in the direction of insertion into the groove 11 that simplify the insertion of the cable 12 into the cable groove 11. Additional slanted or inclined surfaces 33 on the opposite side of the shoulders or projections 17, on the other hand, simplify the disassembly of the cable, e.g. in the case of any repairs or the like.

As may be appreciated from FIG. 3, the cable groove 11 is completely arranged within the fitting groove 9 and has an axis of symmetry 20. As shown, however, the cable groove 11 in the groove 9 lies slightly shifted to one side of the groove 9, centered below the opening into the groove 9.

In addition, both grooves 9, 11 have the same bottom and/or base 19 from which lateral bridges or projections 21 for the cable groove 11 protrude at an angle, in particular at a right angle, at least in the illustrated embodiment.

At the free end of these bridges or projections 21, the bridges or projections 22, which are aligned with each other, form undercuts to lock the ribbon cable 12 in place within the groove 11.

The bridges or protrusions 22 are equipped with slanted or inclined surfaces 23 on the outside and/or towards the side of the groove opening in order to simplify the installation of the ribbon cable 12. The inner bridge surface 24 serves to reach behind the ribbon cable 12 to hold the ribbon cable in the groove 11. The ribbon cable 12 fills the groove 11 almost completely and closes the groove 11 with an essentially level surface.

The groove bridges or protrusions 22 form lateral chambers 25 and 26 in the fitting groove 9. These chambers 25 and 26 are of different sizes, which results in an asymmetric arrangement in the fitting groove 9. Functional elements (such as electrically functional elements, as described above) may be located in these chambers 25, 26.

The fitting groove 9 and/or the cable groove 11 may be formed at any of the typically four frame profiles or segments of the sash. The ribbon cable 12 may be used in this respect in a simple manner as a supporting surface for a fitting or for any other functional element in the groove (not shown here). The arrangement of the cable groove 11 in the fitting groove 9 is particularly advantageous but not mandatory to practice the invention.

The fitting groove 9 has lateral walls 27a, 28a as well as bridges or protrusions 27b, 28b turned inward that are clearly thicker and longer than the bridges 11 associated with the cable groove 11. The bridges or protrusions 21, 22 of the cable groove 11 hold the ribbon cable 12 and otherwise do not have to assume a load-bearing function in this embodiment. Accordingly, the bridges or protrusions 21, 22 may be designed in a material-saving manner.

Any fittings and ribbon cables 12 may be arranged in a compact way in the clearance of the fitting groove 9 directly above the cable groove 11, without the ribbon cable 12 interfering with the installation of the fittings.

The heights 29 and 30 of the bridges or protrusions associated with the grooves 9 and 11 are selected so that the smaller height 29 is ⅓ of that of the larger height 30. With this ratio, the differences in the heights 29, 30 leaves sufficient space in the fitting groove 9 for an arrangement of the actual fitting parts and/or other functional elements.

Figure 4:
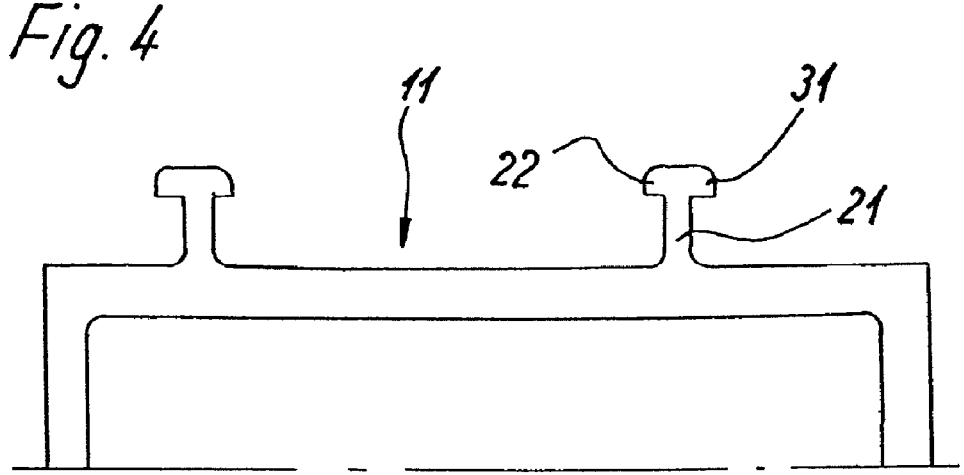
FIG. 4 shows an additional design in a partial cross section similar to FIG. 2.
Figure 5:
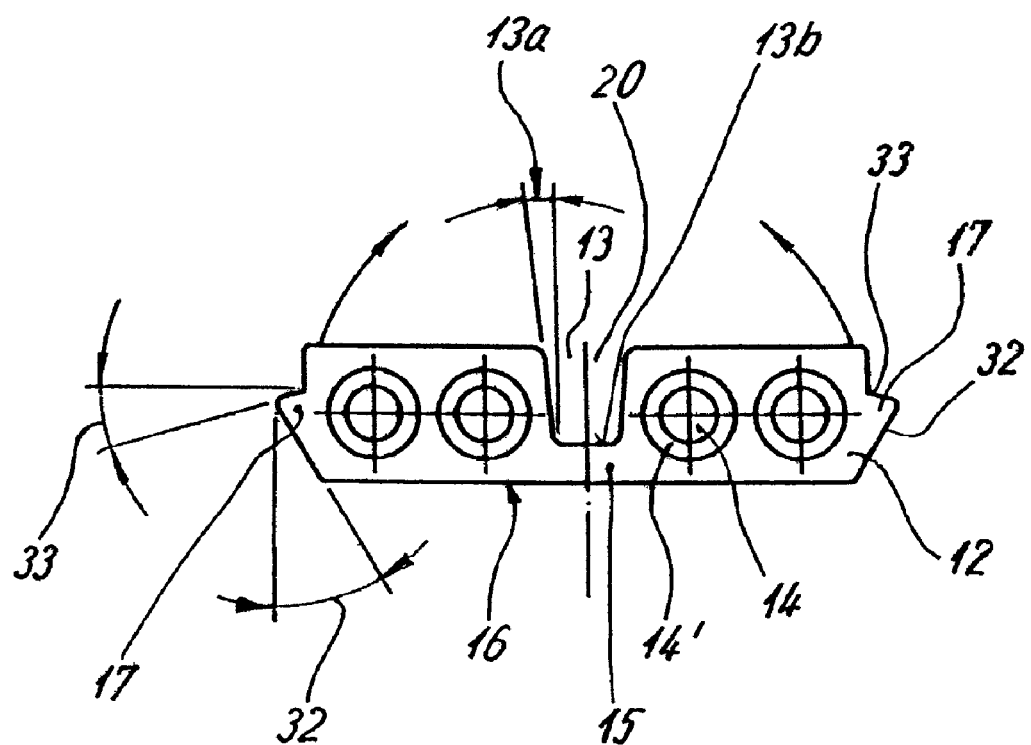
FIG. 5 shows a view of the axial end of one embodiment of a ribbon cable in accordance with the invention.

FIG. 4 illustrates an alternative design of the invention in which additional bridges or protrusions 31 are formed on the side of the cable groove bridges 21 opposite the bridges 22 on which a plug element for contacting the conductors of the cable 12 may be locked in place (not shown here). This variant is preferred if the cable groove 11 is not arranged within a fitting groove or the like. Alternatively, the locking of the plug may occur in the fitting groove at the bridges 27, 28.

The ribbon cable 12 and the cable groove 11 are designed in such a way that the ribbon cable 12 is safely locked in the cable groove 11 but retains at least a slight amount of lateral freedom or play within the cable groove 11. This play makes it possible to align the ribbon cable 12 in the groove 11, for example, by means of a frame on which a plug is placed, or e.g. by means of the plug itself.

Figure 6:
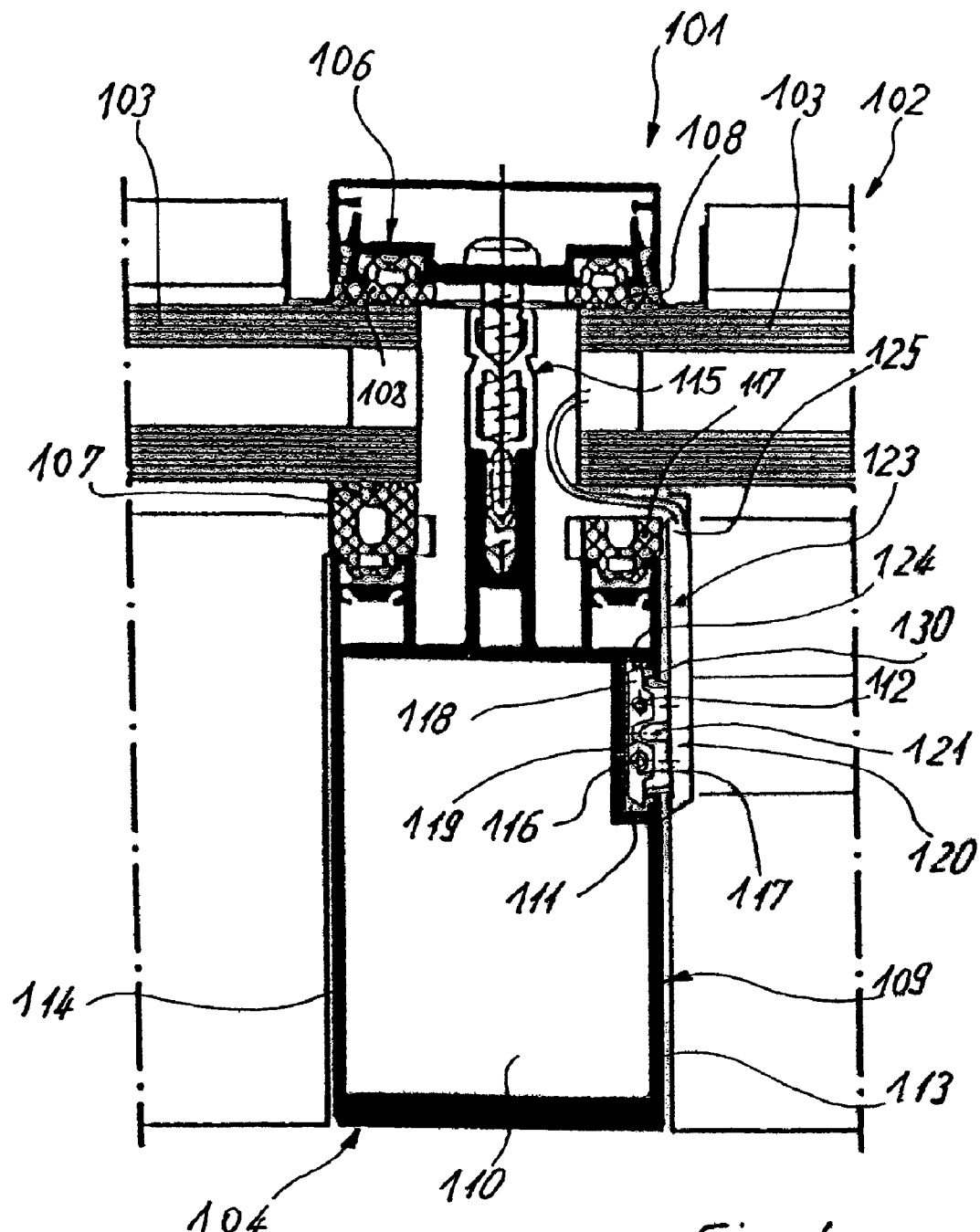
FIG. 6 shows a cross-section of an area of a first post profile of a facade.

FIG. 6 illustrates a post profile 101 of a facade 102 which includes a frame construction of post and bolt profiles as well as plane elements such as disks 103 or the like. Since the invention according to this variant is realizable on the post profiles as well as on the bolt profiles and is wholly or partially arranged around the framework, reference will be made in the following more generally to a facade profile.

Here, the facade profile 101 has an interior profile 104, an insulator 105 and an exterior shell 106. Between the interior profile 104 and the exterior shell 106, sealants 107, 108 are arranged on both sides of the insulator 105, each of which rests against one of the disks 103.

The interior profile 104 includes a box profile 109 disposed oppositely from the disk 103 which encloses a hollow chamber 110.

The interior and exterior shells are, as a rule, made of metal, such as a light-weight metal including an aluminum alloy.

As illustrated, the interior profile 104 is provided with an undercut cable groove in the area of the box profile 109 for a form-fitting accommodation of a cable, in particular of a ribbon cable 112. Here, the interior profile is particularly advantageously formed on one of the two lateral walls 113, 114 aligned vertically to the window pane plane of the interior profile and/or the interior shell 104.

The exterior 106 and the interior profile 104—i.e. the individual profiles of the composite profile—are in each case executed as metal profiles and are made, for example, of a light-metal material or of steel. It is also conceivable to make them of wood or plastic. In warmer climatic zones and/or in the interior refurbishment of buildings it is also conceivable to dispense with a composite construction with an insulation bridge 105.

Figure 7:
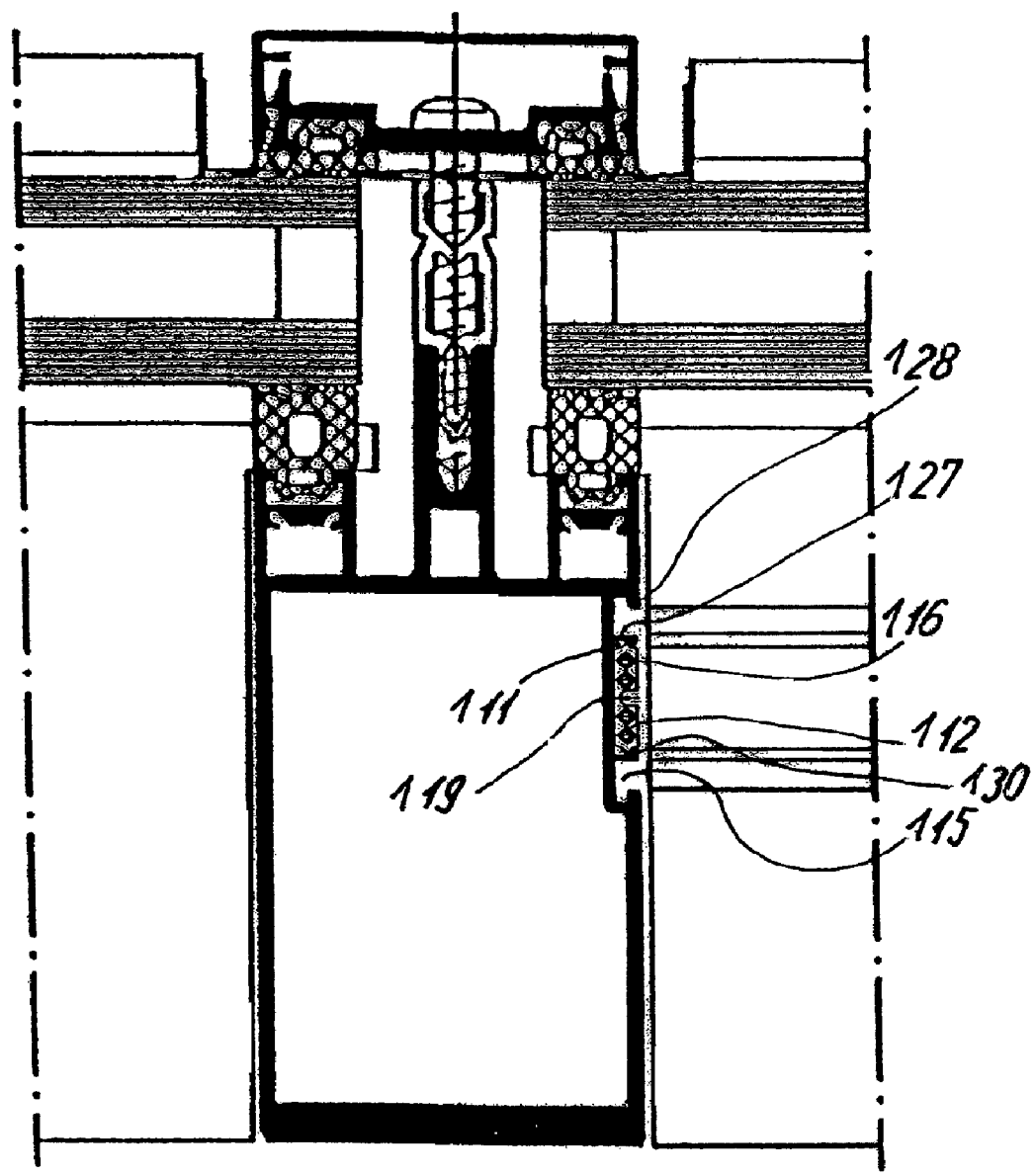
FIG. 7 shows a cross-section of an area of a second post profile of a facade.

As illustrated in FIG. 7, the cable groove 111 is formed within a surrounding groove 115 which preferably serves to accommodate functional elements such as transformers, fitting parts or drives, e.g. to supply power to illuminants (such as lights) or the like, as well as to attach a plug. This surrounding groove 115 also is formed on the side of the interior profile vertical to the window pane plane, in particular on one of the two lateral walls 113, 114 of the box profile, preferably again immediately below the support areas for the sealants 107, 108.

According to FIG. 7, the cable groove 111 is located at the base of the additional surrounding groove 115, which allows the ribbon cable 112 to be arranged invisibly from the outside and, again, in a space-saving manner. But it is also conceivable to have an arrangement at another location of the exterior circumference of the profile of the facade, although the chosen arrangement is preferred as particularly assembly-friendly and protected from the elements.

The ribbon cable 112 simply may be clipped into the cable groove 111 from the exterior of the cable groove 111.

The cable groove 111 in the groove 115 extending parallel to the facade profile at the latter's exterior side in accordance with FIG. 7 provides the advantage that the ribbon cable 112 lies especially well protected and covered and will not disturb the view, without making the installation more difficult.

Facade elements, in the sense of this invention, include lighted roof elements.

The cable groove 111 for the accommodation of an electrically conducting cable is always advantageous when the task at hand is to provide functional elements such as, for example, locking elements, sensors, illuminating devices such as, for example, illuminating diodes, or a drive for opening and closing the window-containing element. In the case of photovoltaic installations, they may also be used as an outgoing feeder of the power that is being generated.

According to FIGS. 6 and 7, the cable groove 111 is formed into the lateral wall of the interior profile 104 in the style of an inward recess towards the hollow chamber 110. According to FIGS. 6 and 7, it has, in each case, bridges or protrusions 130 abutting inward behind which the ribbon cable 112 may be locked in place.

According to FIG. 6, the bridges or protrusions 130 are designed to be tiered into each other as a "borderline case of the groove in the groove", which means that they can be used to lock in a cover and/or a plug.

According to FIG. 6, the ribbon cable 112 has two and according to FIG. 7, four conductors or, respectively, strands 116 that are arranged parallel to each other in one layer, each of which has an insulation 117 and is imbedded in the casing 118 or base plate of the ribbon cable 112. As noted above, the strands 116 may be contacted in the cable groove 111 from the exterior, for example by means of insulation-piercing or cutting piercing contacts.

Between the two central conductors, the cable casing 118 is provided here with a groove-like notch 119 that runs parallel to the conductors 114 in their longitudinal extension and that provides the advantage of aligning and/or centering the ribbon cable 112 in the groove 111 by placing on the groove 111 a corresponding plug 120 that has a centering lip 121 that engages with the notch 119.

The centering lip 121 may be designed with a spring, meaning that first it aligns the cable 112 and then compresses the cable 112 before insulation-piercing contacts touch the conductors 114.

The plug has a casing or cover 123 on which the centering lip 121 is formed. Locking projections 124 serve to lock in the cable groove and/or in the surrounding groove (FIG. 7).

A lateral casing lip 125 may extend into the area of the glass installation seals that, for example, are penetrated vertically by a cable on the plug in order to connect sensors or photovoltaic elements or the like, for example in the glass rebate (or recess), with the ribbon cable 112.

The notch 119 preferably has a conical cross section and penetrates the ribbon cable 112 almost completely (e.g. by approximately 60-70%), which means that it can be bent and/or compressed when inserted into the cable groove 111 until it is located in the cable groove where it will expand. The notch 119 also serves to center, by means of a corresponding centering device (frames, not shown here), to allow the strands 116 to be precisely contacted.

The ribbon cable 112 is elastic in this embodiment. In particular, the casing is made of a flexible material, for example of EPDM, to make it possible to easily bend and/or place the ribbon cable 112, as discussed above. In this respect, the cable groove 111 may also be designed completely or partially circumferential (again not shown here).

The ribbon cable 12 illustrated in FIG. 2, for example, exemplarily includes four strand-like conductors 14. But models with more or fewer conductors 14 also are conceivable, if, for example, only one power supply is required to supply an electric drive. This ribbon cable 12 makes stock keeping very simple, as discussed above.

The ribbon cable 112 has lateral projections or shoulders that engage elastically behind bridges or protrusions 130 of adjacent and protruding inwardly into the cable groove 111.

According to FIG. 7, the plug can be locked onto inwardly protruding bridges 128 of the surrounding groove 115. A centering frame may be assigned to the single or multiple-part plug to align the cable 112, which frame is initially locked onto the groove and which aligns the cable 112 before the plug contacts the cable 112 (not shown here). The plug may also be clamped or screwed into the profile for anchoring purposes.

In addition, both grooves 111, 115 have one and the same bottom and/or base 119 from which the lateral marginal bridges or protrusions 127 of the cable groove 111 protrude at an angle, in particular at a right angle. At the free ends of these bridges or protrusions 127, the bridges or protrusions 130 face one another and form the undercuttings for the locking of the ribbon cable 112 and/or of the plug 120.

The ribbon 112 fills the groove 111 almost completely and closes it with an essentially level surface.

In the areas in which no plugs are placed on the cable grooves 111 or the grooves 115, the latter can be closed with preferably pluggable coverings (not shown here).

According to FIGS. 6 and 7, bridges or protrusions directed at each other are thus formed at the free ends of the marginal bridges or protrusions of the cable groove 111 that form an undercutting for at least the cable 112. Preferably, the bridges or protrusions 130 are formed in steps and form an undercutting for the cable 112 and a plug 120 that may be locked onto the cable groove 111 from a position exterior to the groove 111. The cable 112, in turn, is preferably formed as a ribbon cable with several conductors 116 preferably arranged parallel to each other in one layer. Here, it has again more than two, preferably four conductors and/or strands 114 arranged parallel to each other in one layer that are imbedded in the casing 118 of the ribbon cable 112. In addition, the cable 112 is disposed in a direction lateral to the locking projections 124. The casing 118 in turn is provided with a groove-like notch 119 which has a conical cross section and which penetrates the cable by more than 50%, preferably almost completely.

In this respect, the plug 120 with insulation piercing contacts is attachable to the facade profile, and, in particular, is lockable on the cable groove 11 or the surrounding groove. The plug can be designed in one or several pieces, and a centering frame may be assigned to it. It is also conceivable that the plug may be clasped or screwed into the facade profile, and/or that a centering lip 121 is formed on the plug to engage in the notch 119 of the cable.

The invention claimed is:

1. A frame section for a window or a door or a façade, the frame section comprising:
    an external shell and an internal shell, each shell having hollow chambers;
    at least one of the shells including a first groove and a second groove;
    the first groove configured to accommodate hardware fittings; and
    the second groove located within and encompassed by the first groove and further located on an outer section of the at least one shell and at a base of the first groove, the second groove configured to accommodate an electrical cable therein.

2. The frame section according to claim 1, wherein the cable includes:
    a plurality of conductors arranged in a single plane parallel to one another, wherein the plurality of conductors each comprise a core;
    an insulation layer disposed around each of the cores;
    a sheathing encapsulating the cores and the insulation layers,
    wherein the sheathing has a ribbon shape with lateral shoulders on lateral sides thereof, and
    wherein the lateral shoulders are adapted to engage flexibly behind protrusions in a cable groove.

3. The frame section according to claim 2, wherein the shoulders include first inclined surfaces adapted to face the second groove in the direction of insertion.

4. The frame section according to claim 3, wherein the lateral shoulders include second inclined surfaces disposed opposite to the first inclined surfaces.

5. The frame section according to claim 2, further comprising a notch in sheathing formed between two of the plurality of conductors.

6. The frame section according to claim 5, wherein the plurality of conductors comprises four conductors and the notch is centered between two center conductors.

7. The frame section according to claim 2, further comprising a notch in the sheathing.

8. The frame section according to claim 7, wherein the notch has a V-shaped cross-section.

9. The frame section according to claim 7, wherein the notch extends into the sheathing by more than 50% of a thickness of the sheathing.

10. The frame section according to claim 7, wherein the notch includes a base that is perpendicular to an axis of symmetry of the sheathing.

11. The frame section according to claim 2, wherein the sheathing is flexible.

12. The frame section according to claim 11, wherein the sheathing is made of ethylene propylene diene monomer rubber.

13. The frame section according to claim 2, wherein the cable is accommodated in a positive fit in the second groove, and the conductors being arranged parallel to one another in a single plane.

14. The frame section according to claim 2, wherein the cable comprises four conductors arranged parallel to one another in a single plane, each with a core and an insulation layer, the conductors being embedded in the sheathing.

15. The frame section according to claim 1, wherein the second groove extends longitudinally to accommodate the cable in a positive fit, wherein the second groove and the cable are configured to complement one another such that the cores are contactable from an exterior of the cable via either insulation-piercing or cutting contacts.

16. The frame section according to claim 15, wherein the second groove includes lateral first projections, which project out of a base at an angle.

17. The frame section according to claim 16, wherein the lateral first projections project out of the base at a right angle.

18. The frame section according to claim 15, wherein the second groove includes:

second projections disposed at ends of the first projections, oriented to face one another, thereby defining an undercut.

19. The frame section according to claim 18, wherein the cable comprises lateral shoulders that engage behind the second projections defined by the second groove.

20. The frame section according to claim 18, wherein the second projections define inclined surfaces, slanted toward an open side of the second groove.

21. The frame section according to claim 1, wherein the first groove extends longitudinally along the frame section.

22. The frame section according to claim 1, wherein the frame section is configured as an interior shell of a composite section.

23. The frame section according to claim 1, wherein the notch, extends parallel to the conductors.

24. The frame section according to claim 23, wherein the notch extends almost entirely through the cable.

25. The frame section according to claim 1, wherein the second groove and the first groove have a common base that lies in a single plane.

26. The frame section according to claim 1, wherein the first groove comprises lateral projections to accommodate the hardware fittings.

27. The frame section according to claim 26, wherein the lateral protrusions of the first groove and lateral protrusions of the second groove have a height ratio of 1/3 with respect to one another.

28. The frame section according to claim 26, wherein the lateral projections of the second groove are configured to be stepped and to form an undercut for the cable and a plug connector insertable into the second groove from an exterior thereof.

29. The frame section according to claim 1, wherein the frame section further comprises at least one interior section, including an insulating web, and wherein the second groove is formed on the at least one interior section.

30. The frame section according to claim 29, wherein the second groove is formed perpendicular to a disk plane on the at least one interior section.

31. The frame section according to claim 29, wherein the second groove is formed on a box section of the at least one interior section.

32. The frame section according to claim 31, wherein the second groove extends from a side panel of the box section into an interior of the box section.

* * * * *